United States Patent [19]

Silfvast et al.

[11] 4,264,375
[45] Apr. 28, 1981

[54] DETECTOR FOR HIGH INTENSITY LASER RADIATION

[75] Inventors: William T. Silfvast, Holmdel; Leo H. Szeto, Howell Township, Monmouth County, both of N.J.

[73] Assignee: Bell Telephone Laboratories, Incorporated, Murray Hill, N.J.

[21] Appl. No.: 76,159

[22] Filed: Sep. 17, 1979

[51] Int. Cl.³ .............................................. H01J 40/00
[52] U.S. Cl. .................................. 136/254; 250/212; 250/338; 313/94; 313/101; 313/113; 313/200
[58] Field of Search ............. 136/89 R, 89 CR, 89 SP; 250/212, 423 P, 338, 341; 313/94, 101, 113, 199, 200

[56] References Cited

U.S. PATENT DOCUMENTS 3,299,306   1/1967   Kapany .................................. 313/95

OTHER PUBLICATIONS

J. F. Ready, "Coupling of $CO_2$ Laser Energy into Ionized Blow Off Material," Optics Letter, vol. 2, pp. 130-132 (1978).
T. V. Arifov et al., "Laser-Induced Current Pulses from a Target in a Gas", Soviet Physics JETP, vol. 28, pp. 201-202 (1969).
W. T. Silfvast et al., "Direct Conversion of $CO_2$ Laser Energy to High-Voltage Electrical Energy", IEEE J. Quant. Elec. vol. QE-3, pp. 96D (1977).
J. S. Pearlman et al., "Charge Separation & Target Voltages In Laser-Produced Plasmas", Appl. Phys. Lett., vol. 31, pp. 414-417 (1977).
W. T. Silfvast et al., "Direct Conversion of $CO_2$ Laser Energy to High-Voltage Electrical Energy Using a Laser-Produced Plasma", Appl. Phys. Lett., vol. 31, pp. 726-728 (1977).
R. E. Honig et al., "Laser-Induced Emission of Electrons, Ions & Neutral Atoms from Solid Surfaces", Appl. Phys. Lett., vol. 2, pp. 138-139 (1963).
D. Lichtman et al., "Laser Beam Induced Electron Emission", Phys. Rev. Lett., vol. 10, pp. 342-345 (1963).
S. Namba et al., "Energies of Ions Produced by Laser Irradiation", J. Appl. Phys., vol. 37, pp. 3330-3331 (1966).
O. V. Bogdankevich et al., "Use of Laser Radiation to Create a Strong Electron Source", Soviet Physics-Technical Physics, vol. 10, pp. 1573-1574 (1966).

Primary Examiner—Aaron Weisstuch
Attorney, Agent, or Firm—Michael B. Einschlag

[57] ABSTRACT

The reliability of a high intensity laser radiation surface ionization detector is increased by providing a target material for the high intensity laser radiation having a target material comprising a metal having a melting point below that of aluminum. The laser radiation detector has a linear response with respect to the incident laser radiation intensity when operated in the range $10^6$–$10^7$ W/cm² and the distance between the target material and the walls of the evacuated chamber in which the target material is placed is less than the Debye length of the electrons in the plasma which was generated when the laser radiation strikes the target metal.

8 Claims, 5 Drawing Figures

DETECTOR FOR HIGH INTENSITY LASER RADIATION

BACKGROUND OF THE INVENTION

The invention relates to the field of detectors for laser radiation and in particular, to detectors of high intensity laser radiation.

Studies have been performed to determine the physical nature of the process whereby laser radiation impinges upon a surface and couples energy into the surface in such a manner as to cause ionization of thin layers of the surface. Reports of these studies are found in the following prior art references: (1) "Coupling of $CO_2$ Laser Energy into Ionized Blowoff Material", by J. F. Ready, Optics Letters, Vol. 2, No. 5, May 1978, pp. 130–132; (2) "Charge Separation and Target Voltages in Laser-Produced Plasmas", by J. S. Pearlman and G. H. Dahlbacka, Applied Physics Letters, Vol. 31, No. 7, October 1977, pp. 414–417; (3) "Direct Conversion of $CO_2$ Laser Energy to High-Voltage Electrical Energy", by W. T. Silfvast and L. H. Szeto, abstract of a talk given at the CLEA Conference, June 1, 1978, IEEE Journal of Quantum Electronics, QE-13, September 1977, on p. 96D; (4) "Direct Conversion of $CO_2$ Laser Energy to High Voltage Electrical Energy Using a Laser-Produced Plasma", by W. T. Silfvast and L. H. Szeto, Applied Physics Letters, Vol. 31, No. 11, December 1977, pp. 726–728; (5) "Use of Laser Radiation to Create a Strong Electron Source", by O. V. Bogdankevich, V. Yu Sudzilovskii and A. A. Lozhnikov, Soviet Physics-Technical Physics, Vol. 10, No. 11, May, 1966, pp. 1573–1574; and (6) "Laser-Induced Current Pulses From a Target In a Gas", by T. U. Arifov, G. A. Askar'yan, I. M. Raevskii and N. M. Tarasova, Soviet Physics JETP, Vol. 28, No. 2, February, 1969, pp. 201–202.

The surface ionization caused by laser radiation impinging upon the surface of a target material which is situated within an evacuated chamber is detected in these above-cited references by the presence of a voltage difference between the target material and the distant chamber wall. These studies of the basic physical phenomenon have not succeeded in producing a laser radiation detector because the output voltages fluctuated from pulse-to-pulse and were not reproducible in a reliable manner. Furthermore, the voltage detected was not linearly related to the intensity when the surface was exposed to laser radiation having intensities in the region of $10^9 W/cm^2$.

SUMMARY OF THE INVENTION

A detector for high intensity laser radiation giving reproducible voltage outputs from pulse-to-pulse which is constructed according to the present invention comprises an evacuating chamber having a window for admitting the high intensity laser radiation and a target material which is electrically insulated from the walls of the chamber and has a melting point below the melting point of aluminum. The window has an aperture which restricts the radiation input so that it impinges solely on the target material.

By restricting the distance between the target material and the chamber wall to be less than the Debye length of the electrons in the plasma which is created by surface ionization of the target material by the incident laser radiation, we obtain the further advantageous result that the output voltage generated between the target material and the chamber wall is linearly related to the input laser radiation intensity.

BRIEF DESCRIPTION OF THE DRAWING

A complete understanding of the present invention and of the above and other objects thereof may be gained from a consideration of the following detailed description presented hereinbelow in connection with the accompanying drawing in which.

DETAILED DESCRIPTION

Figure 1:
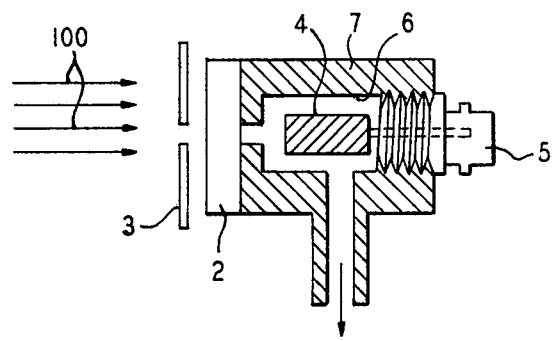
FIG. 1 shows in cross section an apparatus in which the present invention was reduced to practice.

A detector constructed according to the present invention is simple to construct and has a high reliability and long life. The detector can be constructed so that it is suitable, among other uses, for detecting laser radiation having intensities of the order of $10^6$–$10^7 W/cm^2$ such as are produced by a $CO_2$ TEA-type laser. The detector has a fast rise-time (2–3ns) and has a sensitivity comparable to or greater than that of photon drag detectors. It also has a transit time delay of $\sim$30–40ns, similar to that of photomultiplier detectors.

The detector operates on the principle of surface ionization whereby the incident high intensity laser radiation pulse ionizes an ultra-thin layer of material from a target surface. The energy of the pulse is transferred to the electrons and ions that have been "blown off" the surface of the target. The electrons are accelerated towards the chamber wall at a much greater velocity than are the ions. When viewed on a short time scale, the positive ions are seen to remain near the target and a charged separation occurs between the electrons and the ions. This charge separation produces an electric field between the target and the chamber walls which is observed as a voltage between the target and the chamber walls. The chamber is evacuated so that the electrons which are ejected from the target are not impeded in their progress toward the chamber wall and for the further reason to prevent an intermediate impurity from serving as a source of electrons which would distort the voltage measurement.

The target material used in the detector must provide a reasonable level of reproducibility with respect to shot-to-shot fluctuations of output voltage for successive pulses of laser radiation having the same intensity. It is necessary to construct the target material out of materials having a melting point below that of aluminum in order to provide for reliable reproducibility of voltage vs. intensity for laser intensities below $10^7 W/cm^2$. It is of further interest to provide not only a reliable detector whose outputs are relatively stable on a shot-to-shot basis, but one whose output is linearly related to the intensity of the incident laser radiation. In order for the detector to provide a linear output, two further conditions beyond the specific material used for the target must be met. First, we require that the number of electrons which are ejected from the surface of the target must be linearly related to the intensity of the incident laser radiation. This is accomplished by restricting the laser intensity in the beam which strikes the target to be below $10^8$W/cm$^2$ and above $10^5$W/cm$^2$. Above these intensities the surface ionization from the target material occurs with such force that the electron population no longer remains linearly related to the incident laser intensity. Second, we require that the number of electrons which are captured by the chamber wall be linearly related to the number of electrons that have been produced by the surface ionization of the target material. This latter condition is met by requiring that the distance traveled by the electrons from the target material to the chamber wall be less than the Debye length. The Debye length is proportional to $(T_e/n_e)^{\frac{1}{2}}$ where $n_e$ is the number of electrons per cubic centimeter and $T_e$ is the electron temperature. This relation shows that higher intensity laser radiation creates a plasma having a smaller Debye length because for such radiation $n_e$ will be higher. This second condition presents one limitation on the dimensions of the apparatus constructed according to the present invention in order that its output be linear with respect to the incident laser radiation intensity.

The discussion presented above is also useful for the purposes of considering a further aspect of the present invention pertinent to the construction of a linear detector. Since we are concerned with first creating a plasma by surface ionization where avalanche mechanisms are minimized in order to provide a linear relation between the laser intensity and number of electrons produced, we can achieve a concomitant advantage with respect to the condition relating to the Debye length. This results because if the number of electrons produced from the target material surface is decreased, we will minimize the avalanche and at the same time increase the Debye length, which is inversely proportional to the electron number density. Thus, this simple relation shows that the device which is linear for a particular range of input laser intensities, may have that range of linearity extended to higher energies by removing from the incident beam a specified fraction of the beam so that the resultant beam which impinges upon the target has fewer photons. This results in a reduction in electron production from the surface of the target material into the range where the device is linear. The output voltage is then scaled to account for the amount of input laser beam which has been diverted. This result is obtained because the mechanism by which the detector operates is attributable to a physical phenomenon which depends on the number of photons in the incident laser beam which reach the target surface.

Similarly, the device may have its range of linear sensitivity increased towards lower intensities by the expedient of converging the incident laser beam so that more photons strike a given unit area of the target material. For example, a converging lens may be used to concentrage the incident laser beam. This will produce an electron number density in the plasma having a value in the range of sensitivity over which the detector is linear. As above, the final answer is ascertained by scaling to account for the amount of the input laser beam that has been converged.

The present invention was reduced to practice using the apparatus shown in FIG. 1. Metal target material 4, constructed out of lead, was electrically connected to BNC type connector 5 which was in turn threaded into an aluminum cylindrical chamber 7 having a chamber wall 6. The front part of the detector has a 3 mm opening which was fitted with an infrared transmitting window 2 for the particular incident laser relation used for the reduction to practice. The chamber was evacuated. A pressure of $\sim 10^{-2}$ Torr was found to be sufficient for efficient operation and was obtained by using a mechanical pump. BNC connector 5 served to electrically isolate target material 4 from chamber wall 6. The voltage produced when laser radiation was incident upon the detector was monitored across a 50$\Omega$ load. Aperture 3 was placed in front of window 2 to prevent the laser radiation in beam 100 from impinging upon any portion of chamber wall 6 where it might produce voltages of opposite polarity to that produced by beam 100 and either reduce the detector signal or produce a negative signal.

Figure 2:
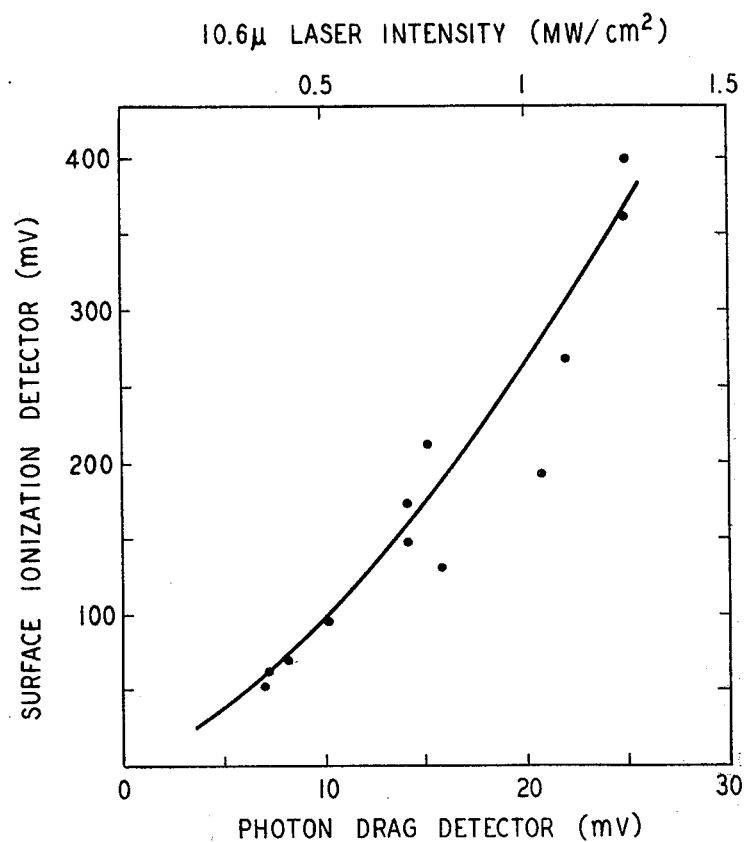
FIG. 2 shows a graphical representation of a comparison of the response of the apparatus shown in FIG. 1 and a photon drag detector to $CO_2$ laser radiation.

The operation of the apparatus was tested by exposing it to a beam of 10.6 $\mu$m laser radiation from a $CO_2$ TEA laser. The beam from the laser was split to provide two beams of equal intensity. The first beam was incident on the apparatus shown in FIG. 1 and the second beam was made incident on an Oriel model PDR6 photon drag detector having a sensitive area almost identical to that of the apparatus shown in FIG. 1 ($\sim 0.1$cm$^2$) and a sensitivity of 0.2mV/kW. The results are shown in FIG. 2 where it can be seen that the surface ionization detector is approximately seven times more sensitive than the photon drag detector and the signal output is substantially linearly related to that produced by the photon drag detector.

Figure 3:
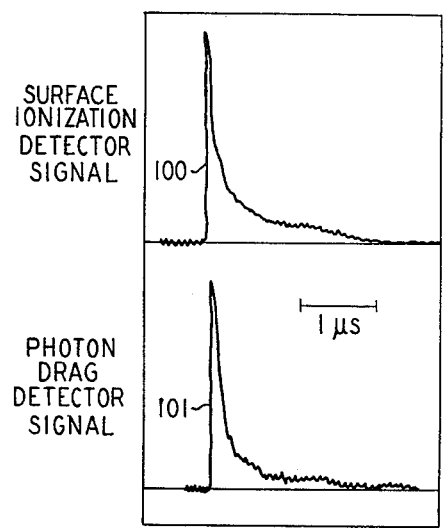
FIG. 3 shows a graphical representation of the response obtained by exposing the apparatus shown in FIG. 1 and a photon drag detector to a $CO_2$ laser pulse.
Figure 4:
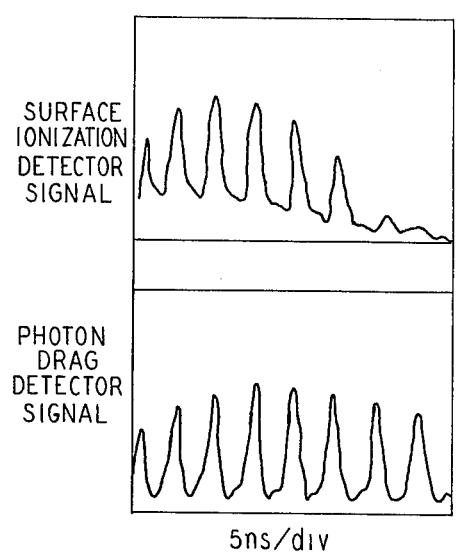
FIG. 4 shows a graphical representation of the response obtained by exposing both the apparatus shown in FIG. 1 and a photon drag detector to laser pulses obtained from a mode-locked $CO_2$ laser.

The temporal response of the surface ionization detector is shown in FIGS. 3 and 4. FIG. 3 shows a typical pulse from a $CO_2$ TEA laser having a 70ns spike and a $\sim 1$ $\mu$s tail as observed with the surface ionization detector and the photon drag detector. The substantially identical nature of the two signals indicates that the surface ionization detector has both a linear as well as a fast response time. Although it is not readily apparent from FIG. 3 due to the time scale used, there is a transit time delay of the surface ionization detector pulse of 30–40ns duration.

FIG. 4 shows the detection results obtained from the same $CO_2$ laser operating in a self-mode-locked configuration. The response from the surface ionization detector appears to be slightly slower than that from the photon drag detector indicating a rise-time for the surface ionization detector of $\sim 2$–3ns.

Initially, the target material used for the reduction to practice was copper. However, the copper target material was found to give a large fluctuation in signal output at the laser intensities used in this reduction to practice. Various surface conditions from rough to smooth were tried. Although roughened surfaces gave the least fluctuation, they were still not satisfactory for a useful detector. Lead and bismuth were found to be much better target materials for this device. They both have low melting points and it was felt that a thin layer of the surface would melt during each pulse and leave the surface in a similar condition for successive laser pulses. When lead and bismuth were used as targets, the detector functioned for many thousands of shots with shot-to-shot fluctuations of the order of 10–20 percent, part of which fluctuation was due to the variation of the input laser pulses.

The detector shown in FIG. 1 also responded to 1.06 μm pulses from a Nd:YAG laser as well as to ~5900A, 0.6 μs duration dye laser pulses.

The lifetime of the detector used in the configuration studied in the reduction to practice appears to be determined by the number of pulses that can be detected before a film of the cathode material coats the window to a thickness which will significantly reduce the next laser signal.

This is estimated to be somewhere between $10^4$ and $10^5$ pulses at the intensities used for this reduction to practice. There is no noticeable window coating after $3 \times 10^3$ shots at an intensity of $\sim 5 \times 10^6 W/cm^2$, which is typical of the output from a TEA $CO_2$ laser.

Although this detector was continually pumped with a mechanical pump, a sealed-off version should not have shortened lifetime. If the window could be occasionally removed and cleaned, and the detector re-pumped, the lifetime should be indefinite.

Figure 5:
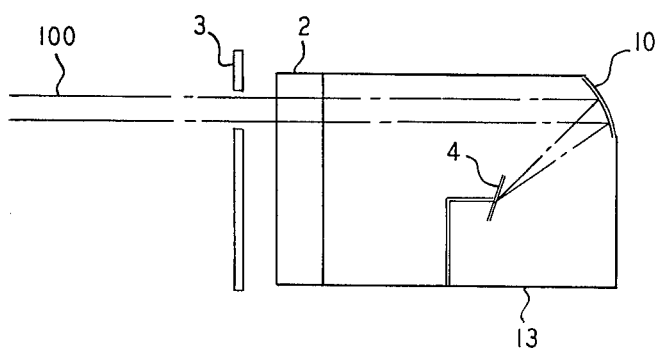
FIG. 5 shows in diagrammatical form an embodiment of the present invention.

The problem with the coating on the window may be reduced by using another embodiment of the present invention where the window is not in the path of the material which is ionized from the target. This embodiment is shown in FIG. 5 where laser beam 100 passes through aperture 3 and window 2 to impinge on reflector 10. The light from reflector 10 then impinges on target 4 to cause surface ionization. However, due to the arrangement of the elements of the device in this embodiment, window 2 does not become coated with material ablated from the target 4.

We claim:

1. A detector for high intensity laser radiation comprising:
   an evacuated chamber having a window for admitting said high intensity laser radiation; and
   a target material, mounted inside said evacuated chamber in such a manner as to be electrically insulated from the walls of said chamber, whereby a voltage is produced between the walls of said evacuated chamber and said target material when said high intensity laser radiation impinges upon said target material;
   characterized in that
   said target material is a material having a melting point below the melting point of aluminum and said window has an aperture which permits radiation to impinge solely on said target material.

2. A detector as defined in claim 1 wherein said target material comprises lead.

3. A detector as defined in claim 1 wherein said target material comprises bismuth.

4. A detector for high intensity laser radiation comprising:
   an evacuated chamber having a window for admitting said high intensity laser radiation; and
   a target material, mounted inside said evacuated chamber in such a manner as to be electrically insulated from the walls of said chamber, whereby a voltage is produced between the walls of said evacuated chamber and said target material when said high intensity laser radiation impinges upon said target material;
   characterized in that
   said target material is a material having a melting point below the melting point of aluminum;
   said window has an aperture which permits radiation to impinge on a reflecting surface, said reflecting surface having the property that it focuses said radiation to impinge solely on said target material.

5. A detector for high intensity laser radiation comprising:
   a focusing element for concentrating said high intensity laser radiation;
   an evacuated chamber having a window for admitting said concentrated beam of high intensity laser radiation; and
   a target material, mounted inside said evacuated chamber in such a manner as to be electricaly insulated from the walls of said chamber, whereby a voltage is produced between the walls of said evacuated chamber and said target material when said high intensity laser radiation impinges upon said target material;
   characterized in that
   said target material is a material having a melting point below the melting point of aluminum and said window has an aperture which permits radiation to impinge solely on said target material.

6. A detector for high intensity laser radiation comprising:
   a focusing element for concentrating said high intensity laser radiation;
   an evacuated chamber having a window for admitting said concentrated beam of high intensity laser radiation; and
   a target material, mounted inside evacuated chamber in such a manner as to be electrically insulated from the walls of said chamber, whereby a voltage is produced between the walls of said evacuated chamber and said target material when said high intensity laser radiation impinges upon said target material;
   characterized in that
   said target material is a material having a melting point below the melting point of aluminum;
   said window has an aperture which permits radiation to impinge on a reflecting surface, said reflecting surface having the property that it focuses said radiation to impinge solely on said target material.

7. A detector for high intensity laser radiation comprising:
   a beam splitting means for extracting from high intensity laser radiation, a beam of lower intensity laser radiation; and
   a target material, mounted inside said evacuated chamber in such a manner as to be electrically insulated from the walls of said chamber, whereby a voltage is produced between the walls of said evacuated chamber and said target material when said high intensity laser radiation impinges upon said target material;
   characterized in that
   said target material having a melting point below the melting point of aluminum and said window has an aperture which permits radiation to impinge solely on said target material.

8. A detector for high intensity laser radiation comprising:
   an evacuated chamber having a window for admitting said high intensity laser radiation; and
   a target material, mounted inside said evacuated chamber in such a manner as to be electrically insulated from the walls of said chamber, whereby a voltage is produced between the walls of said evacuated chamber and said target material when said high intensity laser radiation impinges upon said target material;

characterized in that said target material is a material having a melting point below the melting point of aluminum and said window has an aperture which permits radiation to impinge solely on said target material; and the distance between said target material and said chamber walls is less than the Debye length for electrons in the plasma generated when said high intensity laser radiation impinges upon said target material.

* * * * *